(12) United States Patent
Maier

(10) Patent No.: US 8,893,499 B2
(45) Date of Patent: Nov. 25, 2014

(54) ADVANCED SUPER-CRITICAL $CO_2$ EXPANDER-GENERATOR

(71) Applicant: William C. Maier, Almond, NY (US)

(72) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 269 days.

(21) Appl. No.: 13/647,972

(22) Filed: Oct. 9, 2012

(65) Prior Publication Data

US 2013/0098037 A1   Apr. 25, 2013

Related U.S. Application Data

(60) Provisional application No. 61/549,434, filed on Oct. 20, 2011.

(51) Int. Cl.
| | |
|---|---|
| *F01K 7/32* | (2006.01) |
| *F01K 7/34* | (2006.01) |
| *F01D 15/10* | (2006.01) |
| *H02K 7/18* | (2006.01) |
| *F04D 27/02* | (2006.01) |
| *F01D 3/00* | (2006.01) |
| *F01D 3/04* | (2006.01) |
| *F02G 1/00* | (2006.01) |
| *F01K 25/10* | (2006.01) |
| *F01K 17/04* | (2006.01) |
| *H02K 5/16* | (2006.01) |
| *H02K 7/14* | (2006.01) |
| *H02K 9/08* | (2006.01) |

(52) U.S. Cl.
CPC ............... *F02G 1/00* (2013.01); *F01K 25/103* (2013.01); *F01K 17/04* (2013.01); *H02K 5/161* (2013.01); *H02K 7/14* (2013.01); *H02K 7/1823* (2013.01); *H02K 9/08* (2013.01)

USPC ................... 60/647; 60/646; 60/657; 60/653; 290/52; 415/1; 415/104; 415/107; 415/176; 415/177; 415/178; 415/179; 415/180

(58) Field of Classification Search
USPC ........ 60/643, 646, 647, 653, 657, 679; 415/1, 415/104, 106, 107, 176, 178, 179, 180; 290/52
See application file for complete search history.

(56) References Cited

U.S. PATENT DOCUMENTS

| | | | | |
|---|---|---|---|---|
| 3,210,553 | A | * | 10/1965 | Cummings .................... 290/4 R |
| 3,950,950 | A | * | 4/1976 | Doerner et al. ................. 60/657 |

(Continued)

FOREIGN PATENT DOCUMENTS

| | | | |
|---|---|---|---|
| DE | 3417038 A1 | * 11/1985 | |
| WO | WO 2013059038 A1 | * 4/2013 | ............... F01D 15/10 |

*Primary Examiner* — Thomas Denion
*Assistant Examiner* — Jessica Kebea
(74) *Attorney, Agent, or Firm* — Edmonds & Nolte, PC

(57) ABSTRACT

An expander-generator is disclosed having an expansion device and a generator disposed within a hermetically-sealed housing. The expansion device may be overhung and supported on or otherwise rotate a hollow expansion rotor having a thrust balance seal being arranged at least partially within a chamber defined in the expansion rotor. Partially-expanded working fluid is extracted from an intermediate expansion stage and a first portion of the extracted working fluid is used cool the generator and accompanying radial bearings. A second portion of the extracted working fluid may be introduced into the chamber defined within the expander rotor via a conduit defined in the thrust balance seal chamber. The second portion of extracted working fluid minimizes unequal axial thrust loads on the expander rotor due to the overhung arrangement.

20 Claims, 3 Drawing Sheets

(56) References Cited

U.S. PATENT DOCUMENTS

| | | | |
|---|---|---|---|
| 4,105,372 A * | 8/1978 | Mishina et al. | 417/243 |
| 4,362,020 A * | 12/1982 | Meacher et al. | 60/657 |
| 5,591,016 A * | 1/1997 | Kubota et al. | 417/365 |
| 5,791,868 A * | 8/1998 | Bosley et al. | 415/104 |
| 5,888,053 A * | 3/1999 | Kobayashi et al. | 417/244 |
| 6,264,440 B1 * | 7/2001 | Klein et al. | 417/420 |
| 7,193,341 B2 * | 3/2007 | Bosen | 310/54 |
| 7,278,818 B2 * | 10/2007 | Bosen | 415/47 |
| 7,948,105 B2 * | 5/2011 | Agrawal et al. | 290/52 |
| 8,146,360 B2 * | 4/2012 | Myers et al. | 60/618 |
| 8,508,062 B2 * | 8/2013 | Gozdawa | 290/52 |
| 8,801,398 B2 * | 8/2014 | Korenblik | 417/368 |
| 2012/0107143 A1 * | 5/2012 | Gilarranz et al. | 417/53 |
| 2012/0306206 A1 * | 12/2012 | Agrawal et al. | 290/52 |
| 2013/0177389 A1 * | 7/2013 | Maier et al. | 415/1 |
| 2014/0037424 A1 * | 2/2014 | Madison | 415/1 |
| 2014/0190172 A1 * | 7/2014 | Maier | 60/772 |
| 2014/0199161 A1 * | 7/2014 | Holder et al. | 415/104 |

* cited by examiner

ADVANCED SUPER-CRITICAL CO₂ EXPANDER-GENERATOR

The present application claims priority to U.S. application No. 61/549,434 filed Oct. 20, 2011. The priority application is hereby incorporated by reference in its entirety into the present application.

BACKGROUND

Heat engines are used to convert heat or thermal energy into useful mechanical work and are often used in power generation plants. One example of a heat engine is an expander-generator system which generally includes an expander (e.g., a turbine) rotatably coupled to a generator or other power converting device. As working fluids are expanded in the expander, the shaft connecting the turbine and generator rotates and generates electricity in the generator.

Most power plant expander-generators are based on the Rankine cycle and obtain high temperature/pressure working fluids through the combustion of coal, natural gas, oil, and/or nuclear fission. Typical working fluids for Rankine cycles include water (steam) and organic fluids. Recently, however, due to perceived benefits in terms of hardware compactness, efficiency, heat transfer characteristics, etc., there has been considerable interest in using super-critical carbon dioxide ($ScCO_2$) as a working fluid for certain heat engine applications. Notable among such applications are nuclear, solar, and waste heat energy conversion cycles.

Many waste heat recovery schemes utilizing $ScCO_2$ as the working fluid have relatively high process temperatures/pressures. For example, in some applications the temperatures can approach or exceed 600° C. and the operating pressures can range from between 1000 and 3000 psia. Elevated operating pressures can potentially impose large axial thrusts on equipment rotors, which may damage accompanying bearing systems if not properly managed. Axial thrusts are conventionally controlled using several methods, including: using a balance piston at the high pressure section, varying the rotor diameter in each section, and/or varying the number of expansion stages that make up each section. These methods, however, sacrifice valuable rotor axial length and otherwise increase the overall weight of the machine, thereby negatively affecting the efficiency of the machine.

What is needed, therefore, is a compact expander-generator that effectively cools the rotating equipment and simultaneously counteracts axial thrusts without sacrificing rotor length or unnecessarily adding to the overall weight of the machine.

SUMMARY

Embodiments of the disclosure may provide a rotating machine. The rotating machine may include a hermetically-sealed housing having an expander rotor and a generator rotor rotatably arranged therein, the generator rotor being supported by one or more radial bearings and the expander rotor being a tubular shaft overhung off one end of the generator rotor and defining a chamber therein. The rotating machine may also include an expansion device disposed within the housing and being configured to expand a working fluid to rotate the expander rotor and thereby drive the generator rotor, a generator disposed within the housing, axially-spaced from the expansion device and partially supported by the generator rotor, and an extraction line fluidly coupled to an intermediate expansion stage of the expansion device and configured to extract working fluid therefrom. The rotating machine may further include a first fluid line fluidly coupling the extraction line to the housing and being configured to introduce a first portion of extracted working fluid into the housing to cool the generator and the radial bearings, and a second fluid line fluidly coupling the extraction line to the chamber and being configured to introduce a second portion of extracted working fluid into the chamber to minimize unequal axial thrust loads.

Embodiments of the disclosure may further provide a method for operating a rotating machine. The method may include expanding a working fluid in an expansion device disposed within a hermetically-sealed housing, the expansion device being configured to rotate an expander rotor having a hollow shaft defining a chamber therein, and driving a generator rotor with the expander rotor, the generator rotor being supported by one or more radial bearings and at least partially supporting a generator disposed within the housing and axially-spaced from the expansion device. The method may also include extracting working fluid from an intermediate expansion stage arranged within the expansion. The method may further include introducing a first portion of extracted working fluid into the housing to cool the generator and the radial bearings, and introducing a second portion of extracted working fluid into the chamber to minimize unequal axial thrust loads.

Embodiments of the disclosure may further provide another rotating machine. The rotating machine may include an expander casing coupled to a generator casing to form a hermetically-sealed housing, the expander casing having an expansion device disposed therein and the generator casing having a generator disposed therein, and a hollow expander rotor arranged for rotation within the expander casing and defining a chamber within the expander rotor. The rotating machine may also include a generator rotor arranged for rotation within the generator casing and being supported by one or more radial bearings, the generator rotor being coupled to the expander rotor with a coupling disposed at least partially within the chamber such that the expander rotor drives the generator rotor, and an extraction line fluidly coupled to an intermediate expansion stage of the expansion device and configured to extract working fluid therefrom. The rotating machine may further include a first fluid line fluidly coupled to the extraction line and configured to introduce a first portion of extracted working fluid into the generator casing to regulate a temperature of the generator and the radial bearings, and a second fluid line fluidly coupled to the extraction line and configured to introduce a second portion of extracted working fluid into the chamber.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
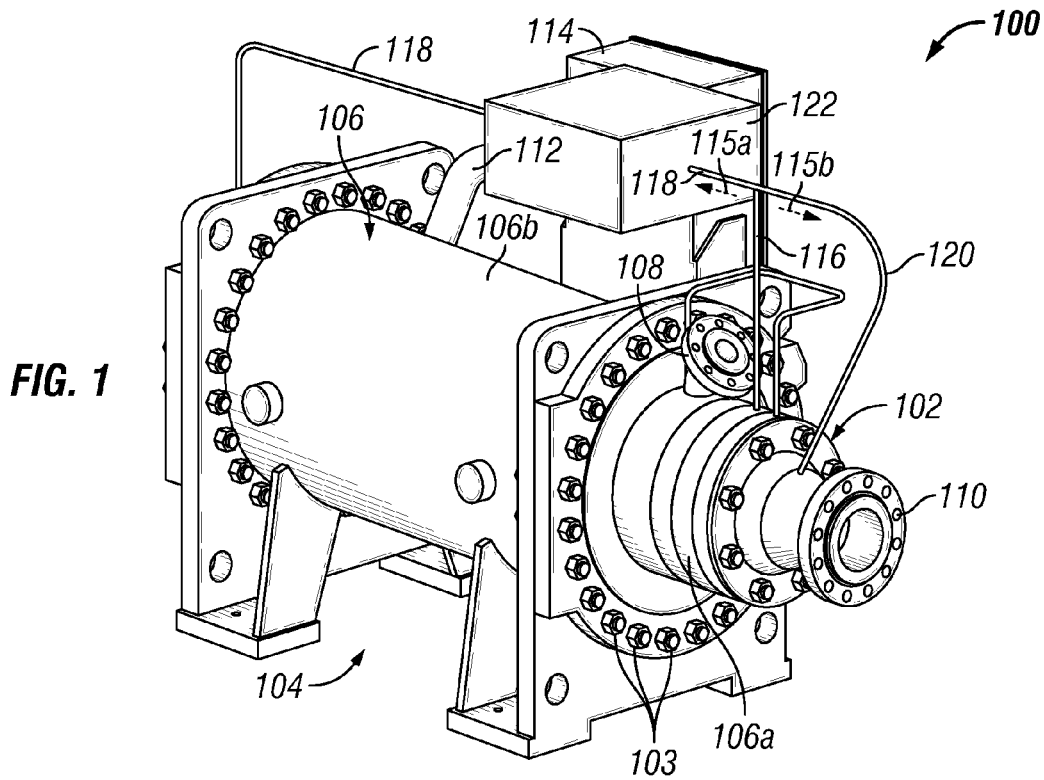
FIG. 1 illustrates an isometric view of an exemplary rotating machine, such as an expander-generator, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary rotating machine 100, according to one or more embodiments of the disclosure. The rotating machine 100 includes an expansion device 102 close-coupled to a generator 104. In other embodiments, the generator 104 may be replaced with other driven devices, such as, but not limited to, pumps, mills, compressors, or other devices/systems configured to receive rotating shaft horsepower to do work. The expansion device 102 and generator 104 may each be hermetically-sealed within a housing 106. In one embodiment, the housing 106 may include an expander casing 106a for enclosing the expansion device 102 and a generator casing 106b for enclosing the generator 104. The housing 106 may be split such that the expander casing 106a may be mechanically-attached to the generator casing 106b using, for example, a series of threaded bolts 103. In other embodiments, the housing 106 may be a common, integral housing that defines both the expander casing 106a and the generator casing 106b for hermetically-sealing both the expansion device 102 and the generator 104 therein, respectively.

As illustrated, the expansion device 102 is arranged in an overhung position with respect to the generator 104, but it will be appreciated that the expansion device 102 may also be placed inboard of any accompanying bearings (center hung) without departing from the scope of the disclosure. The expansion device 102 may be an axial-flow expander or turbine. In other embodiments, the expansion device 102 may be a radial-flow expander or turbine.

The expansion device 102 includes an inlet 108 that receives a working fluid to be expanded. The term "working fluid" is not intended to limit the state or phase of the working fluid. Rather, the working fluid may be in a liquid phase, a gas phase, a super-critical phase, a sub-critical state, combinations thereof, or any other phase or state. In one embodiment, the working fluid may be water (e.g., steam) or air. In other embodiments, the working fluid may be carbon dioxide ($CO_2$), such as super-critical carbon dioxide ($ScCO_2$). Carbon dioxide is a greenhouse-friendly and neutral working fluid that offers benefits such as non-toxicity, non-flammability, easy availability, low price, and no need of recycling. The term "carbon dioxide" is not intended to be limited to a $CO_2$ of any particular type, purity, or grade. For example, in at least one embodiment industrial-grade $CO_2$ may be used.

In other embodiments, the working fluid may be a binary, ternary, or other combination working fluid blend. The working fluid combination can be selected for the unique attributes possessed by the fluid combination within heat recovery systems. For instance, one such fluid combination includes a liquid absorbent and $CO_2$. In another embodiment, the working fluid may be a combination of $CO_2$ and one or more other miscible fluids or chemical compounds. In yet other embodiments, the working fluid may be a combination of $CO_2$ and propane, or $CO_2$ and ammonia, without departing from the scope of the disclosure.

After the working fluid is expanded in the expansion device 102, an expanded working fluid is discharged from the expansion device 102 via an outlet 110. Expanding the working fluid causes the internal components (not shown) of the generator 104 into rotational movement, thereby producing power that may be discharged from the generator via line 112 and directed to a receiving station 114. The receiving station 114 may include, but is not limited to, a transformer, a busbar, one or more variable frequency drives, an AC-DC converter, a machine to be powered (e.g., a motor), combinations of the same, or the like.

A portion of the working fluid may be extracted from an intermediate expansion stage of the expansion device 102 via an extraction line 116. The extraction line 116 may be subsequently split into a first fluid line 118 and a second fluid line 120 whereby the extracted working fluid serves a dual purpose. A first portion 115a of the extracted working fluid in the first fluid line 118 may be cooled in a heat exchanger 122 and subsequently fed into the generator casing 106b to cool the generator 104 and its accompanying components therein. A second portion 115b of the extracted working fluid in the second fluid line 120 may be re-injected back into the expansion device 120 to equalize axial thrusts generated by the expansion device 102. The dual purpose of the extracted working fluid will be described in greater detail in FIGS. 2 and 3 below.

Figure 2:
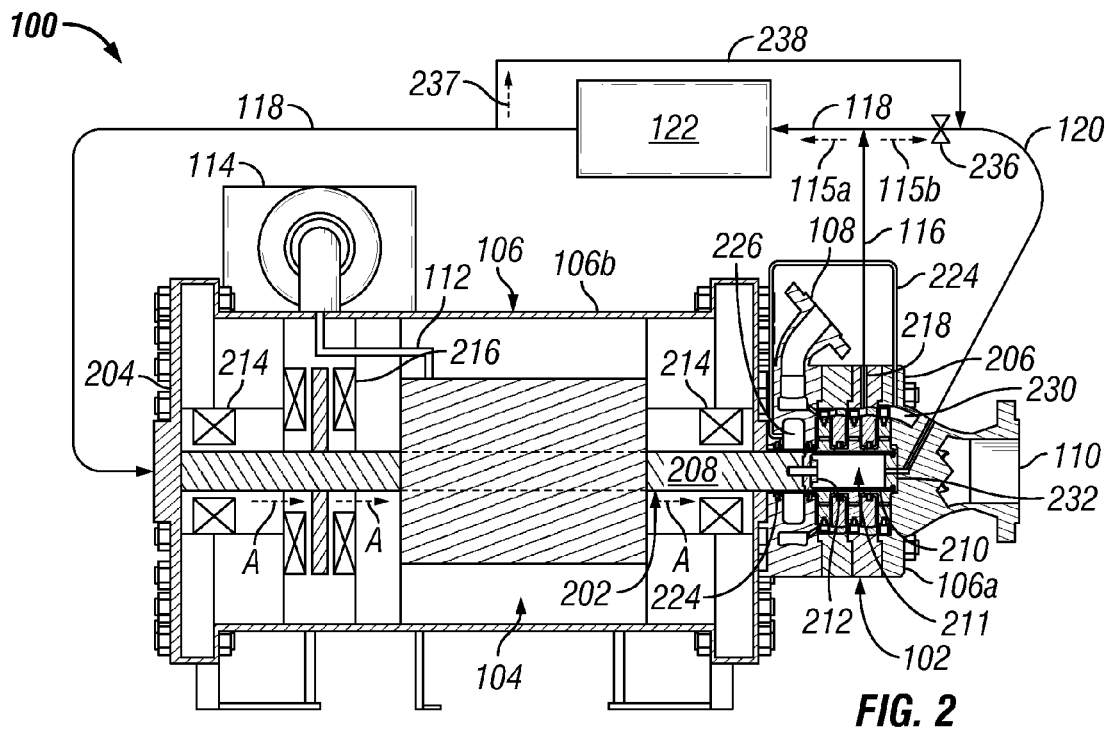
FIG. 2 illustrates a partial, cross-sectional view of the expander-generator of FIG. 1.
Figure 3:
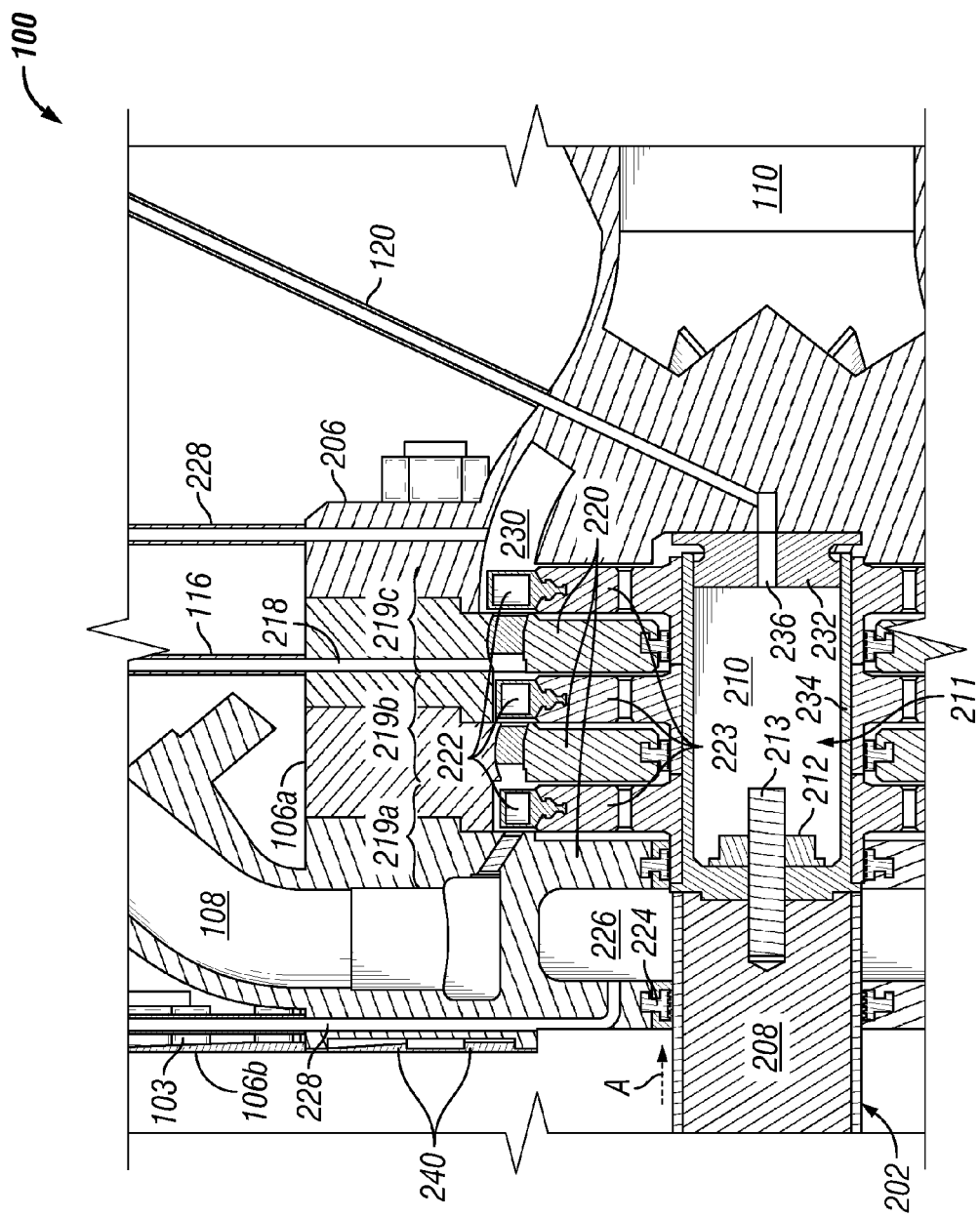
FIG. 3 illustrates a magnified, cross-sectional view of a portion of the expander generator of FIG. 1.

Referring now to FIGS. 2 and 3, illustrated is a partial cross-sectional view (FIG. 2) and a magnified, cross-sectional view (FIG. 3) of the rotating machine 100, according to one or more embodiments described. The housing 106 includes a non-drive end 204 and a drive end 206, and a shaft 202 that extends substantially between the two ends 204, 206. In one embodiment, the shaft 202 may be an integral, single-piece rotor. In other embodiments, however, the shaft 202 may be split and include a generator rotor 208 coupled to an expander rotor 210.

In one or more embodiments, the generator rotor 208 may be a solid shaft supported at each end by one or more radial bearings 214 (two sets of radial bearings 214 are shown). The radial bearings 214 may be directly or indirectly supported by the generator casing 106b, and in turn provide support to the generator rotor 208 which carries components for the generator 104. In one embodiment, the bearings 214 may be magnetic bearings, such as active or passive magnetic bearings. In other embodiments, however, other types of radial bearings 214, such as gas bearings, may be used without departing from the scope of the disclosure. In addition, at least one axial thrust bearing 216 may be provided at or near the end of the generator rotor 208 adjacent the non-drive end 204 of the machine 100. The axial thrust bearing 216 may be a magnetic bearing configured to bear at least a portion of the axial thrust generated by the expansion device 102. It will be appreciated, however, that the axial thrust bearing 216 may be arranged in other locations along the generator rotor 208, or omitted altogether, without departing from the scope of the disclosure.

In one or more embodiments, the expander rotor 210 may be a hollow or tubular shaft overhung off one end of the generator rotor 208. As shown in FIG. 3, the expander rotor 210 defines a chamber 211 therein, and a thrust balance seal 232 may be arranged at least partially within the chamber 211 on an inner circumferential surface 234 thereof. In an embodiment, the thrust balance seal 232 may be a radial labyrinth seal, but in other embodiments the thrust balance seal 232 may be any other type of seal capable of sealing the inner circumferential surface 234 of the expander rotor 210. The thrust balance seal 232 may include a centrally-defined conduit 236. The conduit 236 may be fluidly coupled to the second fluid line 120 for receiving the second portion 115b of extracted working fluid, as will be described in greater detail below.

As will be appreciated by those skilled in the art, having the thrust balance seal 232 placed on the inner circumferential surface 234 of the expander rotor 210 allows for a much shorter rotor 210 that would otherwise consume valuable shaft real estate with the axial length of the thrust balance seal 232. Moreover, since the expander rotor 210 is a substantially tubular shaft, the rotor 210 may be much lighter than a solid shaft and therefore contribute to improved rotordynamic characteristics.

The rotors 208, 210 may be coupled together at an intermediate location on the shaft 202 with, for example, a coupling 212. The coupling 212 serves to maintain concentricity between the two rotors 208, 210 and transmit the torque from the expansion device 102 to the generator 104. The coupling 212 may be at least partially received within the chamber 211, as depicted. The coupling 212 may include a mechanical attachment device, such as spigot fit (radial step) for concentricity and an axial stud/nut 213 arrangement to preload the axial faces and thereby provide torque transmission through friction. In other embodiments, the coupling 212 may be any other type of coupling known in the art, flexible or rigid, and suitable for removably attaching the expander rotor 210 to the generator rotor 208. For example, other coupling systems 212 could be used such as a curvic or hirth-toothed interface with one or more axial bolts. In other embodiments, the expander rotor 210 may also be attached through a hydraulic shrink fit with suitable end treatment.

The expansion device 102, as shown in FIG. 3, includes three axially-adjacent expansion stages 219, shown as first 219a, second 219b, and third 219c expansion stages. It will be appreciated, however, that any number of expansion stages may be employed without departing from the scope of the disclosure. Each expansion stage 219 includes a non-rotating stator vane 220 followed axially by a rotating blade 222 mounted on the outer radial extent of a disk-shaped wheel 223. The wheel 223, in turn, is mounted on the expander rotor 210 or otherwise forms an integral part thereof. In operation, the working fluid enters the expansion device 102 via the inlet 108 and proceeds to the first expansion stage 219a where the first stator vane 220 directs the working fluid into the axially-succeeding blade 222. As the working fluid contacts the blade 222, the expander rotor 210 is caused to rotate. The partially-expanded working fluid in the first expansion stage 219a is then directed to the second and third expansion stages 219b, 219c, successively, and the foregoing process is repeated in each stage 219b,c. As the working fluid progresses through the expansion stages 219a-c from left to right, more rotational force is imparted to the expander rotor 210 and the pressure and temperature of the working fluid progressively decreases.

As briefly described above, a portion of the working fluid may be extracted from an intermediate expansion stage 219 of the expansion device 102 and fed into the extraction line 116. As used herein, "intermediate expansion stage" refers to any expansion stage following the initial or first expansion stage. Extracting the working fluid from an intermediate expansion stage may take advantage of the decrease in pressure and temperature that the working fluid undergoes from its initial levels as introduced at the first expansion stage.

An extraction port 218 may be in fluid communication with at least one of the intermediate expansion stages, for example, either the second or third expansion stages 219b,c. As illustrated, the extraction port 218 is fluidly coupled to the second expansion stage 219b and fluidly communicates the extracted working fluid to the extraction line 116. In at least one embodiment, the extraction port 218 may be fluidly coupled to the third and last expansion stage 219c (i.e., nearest the outlet 110) where the working fluid is at or near the exhaust pressure. Extracting fluid from the last expansion stage 219c, where the pressure and temperature of the working fluid is at its lowest, may limit or otherwise prevent parasitic windage losses experienced in the generator casing 106b during cooling of the generator 104 and its associated components.

After being split from line 116, the first fluid line 118 feeds the first portion 115a of extracted working fluid into the heat exchanger 122 to produce a cooled and/or conditioned working fluid. The heat exchanger 122 may be any device adapted to reduce the temperature of a fluid such as, but not limited to, a direct contact heat exchanger, a trim cooler, a mechanical refrigeration unit, and/or any combination thereof. In at least one embodiment, the heat exchanger 122 may also include a separator device (not shown) configured to remove any hydrates or contaminants from the working fluid, such that a clean and dry cooling gas is discharged.

The cooled working fluid discharged from the heat exchanger 122 may then be directed to the non-drive end 204 of the machine 100 to be injected into the generator casing 106b. In other embodiments, the cooled working fluid may be injected at other locations on the generator casing 106b and serve the same purpose without departing from the scope of the disclosure. The cooled working fluid may course through the interior of the generator casing 106b in the general direction indicated by the arrows A. As the cooled working fluid progresses in direction A, it simultaneously draws heat away from the generator 104 and each bearing 214, 216, thereby cooling or otherwise regulating the temperature of said components.

The cooled working fluid is eventually exhausted from the generator casing 106b through a radial seal 224 (shown in FIG. 3) and into an intermediate chamber 226 defined in the expander casing 106a. The radial seal 224 may be disposed about the shaft 202 (i.e., the generator rotor 208) and configured to isolate the generator 104 from the incoming working fluid in inlet 108. Accordingly, the radial seal 224 may maintain the generator casing 106b at the pressure of the working fluid extracted at the extraction port 218. In one embodiment, the radial seal 224 may be a radial labyrinth seal.

As illustrated in FIG. 3, the intermediate chamber 226 may be fluidly connected to an exhaust duct 230 via a balance line 228. The exhaust duct 230 is defined in the expansion device 102 adjacent the outlet 110. Via the balance line 228, the intermediate chamber 226 may be maintained at or near the exhaust pressure of the outlet 110. This serves two purposes; first, it provides a location where the cooling and leakage flows can flow to that is maintained at a lower pressure; and second, it helps minimize any pressure-induced thrust issues around the expansion device 102.

The second fluid line 120 may receive the second portion 115b of extracted working fluid from the extraction line 116. The second portion 115b of working fluid may be used to counteract at least a portion of the axial thrust loads generated by the expansion device 102. As shown in FIG. 3, the second fluid line 120 is fluidly coupled to the thrust balance seal 232, thereby placing the chamber 211 in fluid communication with the extraction port 218. Consequently, the expander rotor 210 is exposed to substantially the same pressures as the generator rotor 208, which is likewise in fluid communication with the extraction port 218 via the first fluid line 118. As a result, the thrust balance seal 232 may be configured to minimize any unequal axial thrust loads on the expander rotor 210 due to the overhung arrangement of the expansion device 120.

As shown in FIG. 2, the second fluid line 120 may also include a valve 236. The valve 236 may be used to divert the second portion 115b of extracted working fluid through the heat exchanger 122 along with the first portion 115a. A separate flow 237 of cooled working fluid may be subsequently separated from the first fluid line 118 via line 238 which may be fluidly coupled to the second fluid line 120 at a location downstream of the valve 236. Accordingly, a cooled working fluid may be injected into the chamber 211 via the thrust balance seal 232 to not only prevent or otherwise counteract axial thrust loads, but also to cool the expander rotor 210.

Referring again to FIG. 3, a thermal isolation chamber 240 may be defined in the housing 106 between the expansion device 102 and the generator 104. In one embodiment, the chamber 240 may be mutually defined by both the expander casing 106a and the generator casing 106b. In other embodiments, however, the chamber 240 may be defined by either the expander casing 106a or the generator casing 106b. The hollow space provided by the thermal isolation chamber 240 may be configured to thermally isolate the expander casing 106a from the generator casing 106b and simultaneously make the overall housing 106 structure lighter.

Figure 4:
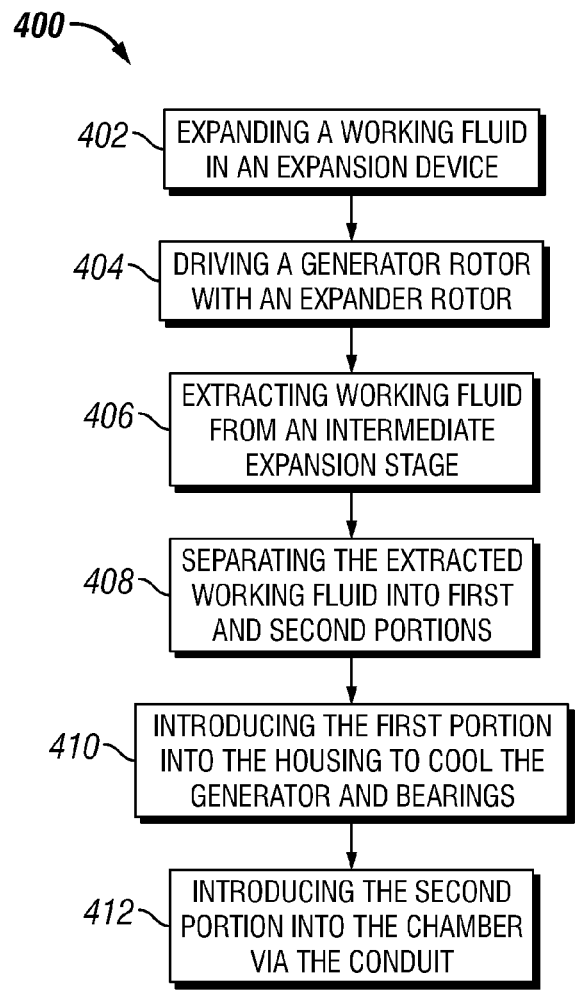
FIG. 4 illustrates a flowchart of a method for operating a rotating machine, according to one or more embodiments disclosed.

Referring now to FIG. 4, illustrated is a flowchart of a method 400 for operating a rotating machine, such as the rotating machine 100 described herein. The method 400 may include expanding a working fluid in an expansion device, as at 402. The expansion device may be disposed within a hermetically-sealed housing and configured to rotate an expander rotor. The expander rotor may include a hollow shaft defining a chamber therein, and a thrust balance seal arranged at least partially within the chamber. The thrust balance seal may define a conduit that fluidly communicates with the chamber. The method 400 may also include driving a generator rotor with the expander rotor, as at 404. In one embodiment, the generator rotor may be supported by one or more radial bearings and at least partially support a generator disposed within the housing. The generator may be axially-spaced from the expansion device.

A portion of the working fluid may be extracted from an intermediate expansion stage arranged within the expansion device, as at 406. An extracted working fluid may be directed into an extraction line that is fluidly coupled to the intermediate expansion stage. The method 400 may further include separating the extracted working fluid into first and second portions of extracted working fluid, as at 408. The first portion of extracted working fluid may be introduced into the housing to cool the generator and the radial bearings, as at 410. The second portion of extracted working fluid may be introduced into the chamber via the conduit defined in the thrust balance seal, as at 412. In operation, the second portion of extracted working fluid may be configured to minimize unequal axial thrust loads, or otherwise generally reduce axial thrust loads on the expander rotor.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A rotating machine, comprising:
    a hermetically-sealed housing having an expander rotor and a generator rotor rotatably arranged therein, the generator rotor being supported by one or more radial bearings and the expander rotor being a tubular shaft overhung off one end of the generator rotor and defining a chamber therein;
    an expansion device disposed within the housing and being configured to expand a working fluid to rotate the expander rotor and thereby drive the generator rotor;
    a generator disposed within the housing, axially-spaced from the expansion device and partially supported by the generator rotor;
    an extraction line fluidly coupled to an intermediate expansion stage of the expansion device and configured to extract working fluid therefrom;
    a first fluid line fluidly coupling the extraction line to the housing and being configured to introduce a first portion of extracted working fluid into the housing to cool the generator and the radial bearings; and
    a second fluid line fluidly coupling the extraction line to the chamber and being configured to introduce a second portion of extracted working fluid into the chamber to minimize unequal axial thrust loads.

2. The rotating machine of claim 1, wherein the housing comprises an expander casing for housing the expansion device and a generator casing for housing the generator, the expander casing being coupled to the generator casing.

3. The rotating machine of claim 2, further comprising a radial seal disposed about the generator rotor and configured to isolate the generator casing from an intermediate chamber defined in the expander casing.

4. The rotating machine of claim 3, further comprising a balance line fluidly coupled to the intermediate chamber and an exhaust duct defined in the expansion device adjacent an outlet of the expansion device.

5. The rotating machine of claim 1, wherein the expander rotor and the generator rotor are coupled together with a coupling arranged within the chamber of the expander rotor.

6. The rotating machine of claim 1, further comprising a thrust balance seal arranged at least partially within the chamber and defining a conduit that fluidly communicates the second fluid line with the chamber.

7. The rotating machine of claim 1, further comprising a heat exchanger fluidly coupled to the first fluid line and configured to cool and/or condition the extracted working fluid before being introduced into the housing.

8. The rotating machine of claim 7, further comprising a valve arranged in the second fluid line and adjustable to divert the second portion of the extracted working fluid through the heat exchanger and thereby provide a cooled working fluid to the chamber.

9. The rotating machine of claim 1, further comprising a thermal isolation chamber defined in the housing between the expansion device and the generator.

10. The rotating machine of claim 1, wherein the working fluid comprises carbon dioxide.

11. A method for operating a rotating machine, comprising:
expanding a working fluid in an expansion device disposed within a hermetically-sealed housing, the expansion device being configured to rotate an expander rotor having a hollow shaft defining a chamber therein;
driving a generator rotor with the expander rotor, the generator rotor being supported by one or more radial bearings and at least partially supporting a generator disposed within the housing and axially-spaced from the expansion device;
extracting working fluid from an intermediate expansion stage arranged within the expansion;
introducing a first portion of extracted working fluid into the housing to cool the generator and the radial bearings; and
introducing a second portion of extracted working fluid into the chamber to minimize unequal axial thrust loads.

12. The method of claim 11, further comprising exhausting the first portion of extracted working fluid through a radial seal and into an intermediate chamber defined in the housing between the expansion device and the generator, the radial seal being disposed about the generator rotor.

13. The method of claim 12, further comprising balancing the pressure in the intermediate chamber with an exhaust duct defined in the expansion device adjacent an outlet of the expansion device, the intermediate chamber and the exhaust duct being fluidly coupled via a balance line.

14. The method of claim 11, further comprising cooling the first portion of extracted working fluid in a heat exchanger prior to being introduced into the housing.

15. The method of claim 14, further comprising:
cooling the second portion of extracted working fluid in the heat exchanger; and
providing a cooled working fluid to the chamber to cool the expander rotor.

16. The method of claim 11, further comprising thermally isolating the expansion device from the generator with a thermal isolation chamber defined in the housing between the expansion device and the generator.

17. A rotating machine, comprising:
an expander casing coupled to a generator casing to form a hermetically-sealed housing, the expander casing having an expansion device disposed therein and the generator casing having a generator disposed therein;
a hollow expander rotor arranged for rotation within the expander casing and defining a chamber within the expander rotor;
a generator rotor arranged for rotation within the generator casing and being supported by one or more radial bearings, the generator rotor being coupled to the expander rotor with a coupling disposed at least partially within the chamber such that the expander rotor drives the generator rotor;
an extraction line fluidly coupled to an intermediate expansion stage of the expansion device and configured to extract working fluid therefrom;
a first fluid line fluidly coupled to the extraction line and configured to introduce a first portion of extracted working fluid into the generator casing to regulate a temperature of the generator and the radial bearings; and
a second fluid line fluidly coupled to the extraction line and configured to introduce a second portion of extracted working fluid into the chamber.

18. The rotating machine of claim 17, further comprising a radial seal disposed about the generator rotor and configured to isolate the generator casing from an intermediate chamber defined in the expander casing.

19. The rotating machine of claim 18, further comprising a balance line fluidly coupled to the intermediate chamber and an exhaust duct defined in the expansion device adjacent an outlet of the expansion device.

20. The rotating machine of claim 17, further comprising a heat exchanger fluidly coupled to the first fluid line and configured to condition the extracted working fluid before being introduced into the generator casing.

* * * * *